United States Patent
Kacines et al.

(10) Patent No.: US 6,447,020 B1
(45) Date of Patent: Sep. 10, 2002

(54) HIGH-PRESSURE INTEGRAL TUBE COUPLING ARRANGEMENTS

(75) Inventors: Steve Kacines, Columbia City, IN (US); Andreas Roglmaier; Hartmut Weiss, both of Garching (DE)

(73) Assignee: C. F. Gomma USA, Inc., Columbia City, IN (US)

(*) Notice: Subject to any disclaimer, the term of this patent is extended or adjusted under 35 U.S.C. 154(b) by 0 days.

(21) Appl. No.: 09/646,706

(22) PCT Filed: Mar. 24, 1999

(86) PCT No.: PCT/US99/06365
§ 371 (c)(1),
(2), (4) Date: Sep. 21, 2000

(87) PCT Pub. No.: WO99/49256
PCT Pub. Date: Sep. 30, 1999

Related U.S. Application Data

(60) Provisional application No. 60/101,630, filed on Sep. 24, 1998, and provisional application No. 60/079,152, filed on Mar. 24, 1998.

(51) Int. Cl.[7] .......................... F16L 33/20; F16L 33/24
(52) U.S. Cl. .......................................... 285/256; 285/55
(58) Field of Search .......................... 285/55, 238, 239, 285/242, 256, 258

(56) References Cited

U.S. PATENT DOCUMENTS

| | | |
|---|---|---|
| 2,310,250 A | 9/1943 | Melsom |
| 3,462,177 A | 8/1969 | Skinner |
| 3,484,121 A | 12/1969 | Quinton |
| 3,501,171 A | 3/1970 | Baron |
| 3,549,180 A | 12/1970 | MacWilliam ............... 285/256 |
| 3,565,116 A | 2/1971 | Gabin |
| 3,711,131 A | 1/1973 | Evans |
| 3,784,236 A | 1/1974 | Slocum |
| 3,924,883 A | 12/1975 | Frank |
| 3,951,438 A | 4/1976 | Scales |
| 4,114,656 A | 9/1978 | Kish ............................ 138/109 |
| 4,208,067 A | 6/1980 | Ragout et al. |
| 4,279,435 A | 7/1981 | Alewitz |
| 4,314,629 A | 2/1982 | Shilander et al. ............ 198/500 |
| 4,486,034 A | 12/1984 | Sauer |
| 4,537,183 A | 8/1985 | Fogarty |
| 4,602,808 A | 7/1986 | Herron et al. |
| 4,635,972 A | 1/1987 | Lyall |
| 4,664,424 A | 5/1987 | Smith |
| 4,674,719 A | 6/1987 | Tanioka et al. |
| 4,690,435 A | 9/1987 | Manning et al. ............. 285/256 |
| 4,775,171 A | 10/1988 | Marshall |
| 4,804,212 A | 2/1989 | Vyse |
| 4,929,002 A | 5/1990 | Sauer |
| 4,929,236 A | 5/1990 | Sampson |
| 5,037,142 A | 8/1991 | Helping |
| 5,307,142 A | 4/1994 | Corbett et al. ............... 365/156 |
| 5,370,425 A | 12/1994 | Dougherty et al. ........... 285/39 |
| 5,387,016 A | 2/1995 | Joseph et al. ................. 285/174 |
| 5,553,896 A | 9/1996 | Woodward .................... 285/47 |
| 5,622,394 A | 4/1997 | Soles et al. .................. 285/256 |
| 5,810,054 A | 9/1998 | Goulet et al. ................ 138/109 |

*Primary Examiner*—Eric K. Nicholson
(74) *Attorney, Agent, or Firm*—Taylor & Aust, P.C.

(57) ABSTRACT

Metal tubes, such as the small diameter metal tubes used in hydraulic braking systems, are connected to hoses also used in such systems by fittings which are configured to receive radially projecting beads on the metal tubes. Each of the fittings includes a body portion with a bore therethrough and a crimping collar which is unitary with the body portion. The body portion receives an insertion end of the tube therethrough, which insertion portion projects into the unitary crimping collar. A radially extending bead on the tube is received in a recess adjacent the bore through the body portion. In one embodiment, the tube is held in place by another bead which is seated in another recess at the opposite end of the bore.

10 Claims, 5 Drawing Sheets

HIGH-PRESSURE INTEGRAL TUBE COUPLING ARRANGEMENTS

This application is a national stage of PCT/US99/06365 filed Mar. 24, 1999 and claims benefit of Provisional Application No. 60/079,152 and 60/101,630 filed Mar. 24, 1998 and Sep. 24, 1998 respectively.

FIELD OF THE INVENTION

The present invention relates to high-pressure integral tube coupling arrangements. More particularly, the present invention relates to such arrangements for coupling flexible hoses, such as a reinforced rubber hoses to metal tubes for use in systems such as vehicle brake and clutch systems.

BACKGROUND OF THE INVENTION

In discussing the automotive industry, the Background of U.S. Pat. No. 5,037,142 states: "a wide variety of connector devices have been utilized to connect tubes to hoses for conducting fluid therethrough or transmitting a hydraulic force through a column of oil contained therein. In many cases, specialized couplings are required which not only hydraulically connect adjacent tubes or pipes, hoses and other conduits in a fluid-tight manner, but also provide effective support while allowing relative movement of components and providing protection in relatively harsh environments."

Current methods for joining hoses to metal tubes still substantially rely on threaded couplings in which an externally threaded hollow nut is threaded into a internally threaded fitting to hold a flared tube tightly within the fitting. Since both the nut and the fitting must be machined, they are relatively expensive. In addition, making the connection is time consuming and labor intensive because it is not conveniently adaptable to automation. Moreover, quality control is difficult because there is the possibility of threaded components being joined without proper alignment so that threads are stripped, resulting in joints that leak and are subject to failure when operated at high pressures over long time periods of time in adverse environments. In view of these difficulties, there have been attempts to form couplings which do not require threaded components. Brazing a tube onto a hose fitting is one approach. Since these couplings are frequently exposed when used with brake systems, clutches and hoses, they are subject to environmental degradation because of moisture, road salt, wide temperature fluctuations and mechanical impacts and vibrations, all of which combine to accelerate corrosion. In order to protect brazed joints from corrosion, it is necessary to plate the assemblies which is in and of itself a relatively expensive undertaking. Moreover, these assemblies frequently require parts which have multiple elements each of which has the potential to provide a leak path and each of which must be handled and stored.

The technology of coupling hoses and tubes is now generally going to "quick-connect" type couplings in which all that is required to achieve a fluid tight connection is for two components being joined to be axially pushed toward one another, so that there is no need to rotate components of a coupling, one with respect to the other. When coupling metal tubes to rubber hoses, it is the practice to crimp the rubber hose within the coupling which is a rapid, reliable process requiring only a single metal-deforming step once the hose is inserted into the coupling. In order to further simplify assembly so as to reduce cost, it is desirable to simplify connecting the tube to a crimpable fitting.

SUMMARY OF THE INVENTION

In view of the aforementioned considerations, it is a feature of the present invention to provide new and improved tube-to-hose couplings which are reliable, inexpensive and yet require manufacturing steps which are minimal and do not introduce difficulties of their own.

In view of this feature and other features, the present invention is directed to a coupling arrangement for connecting a tube to a hose wherein the tube has a main portion and an insertion portion, the insertion portion being inserted through the fitting into the hose. The tube further has at least a first outwardly extending radial projection which cooperates with the fitting, the insertion portion of the tube extending beyond the radial projection to the terminus of the tube. The fitting has a first portion with a bore for receiving the tube therethrough and a second portion extending axially from the first portion for receiving the hose therein, with an interior surface on the first portion facing the second portion. The tube is disposed in the bore of the fitting with the outwardly extending projection abutting the interior surface on the first portion and the insertion portion extending into the second portion of the tube for insertion into the hose.

In a further aspect, the fitting includes a second abutment surface thereon facing away from the second portion for opposing axial movement of the tube toward the second portion of the fitting, and in a still further aspect, the portion of the tube engaged by the second abutment surface is on the first projection.

In a further aspect, the second abutment surface is on a portion of the fitting which is radially and axially deformed into abutment with the second abutment surface.

In still a further aspect, the second axially extending abutment is at a radially extending end of the fitting.

In a further aspect, the second portion of the fitting is a crimping collar for radially engaging the hose while the insertion portion of the tube is within the hose.

In still a further aspect of the invention, the main portion of the tube is covered with a layer of deformable protective material with the insertion portion and radially extending radial protection being uncoated. In accordance with this aspect of the invention, there is a metal-to-metal seal between the fitting and the uncoated radial projection. On the other hand, the definable protective material may be pressed into the fitting to provide a sealing area.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Prior Art Arrangements: FIGS. 1–4

Figure 1:
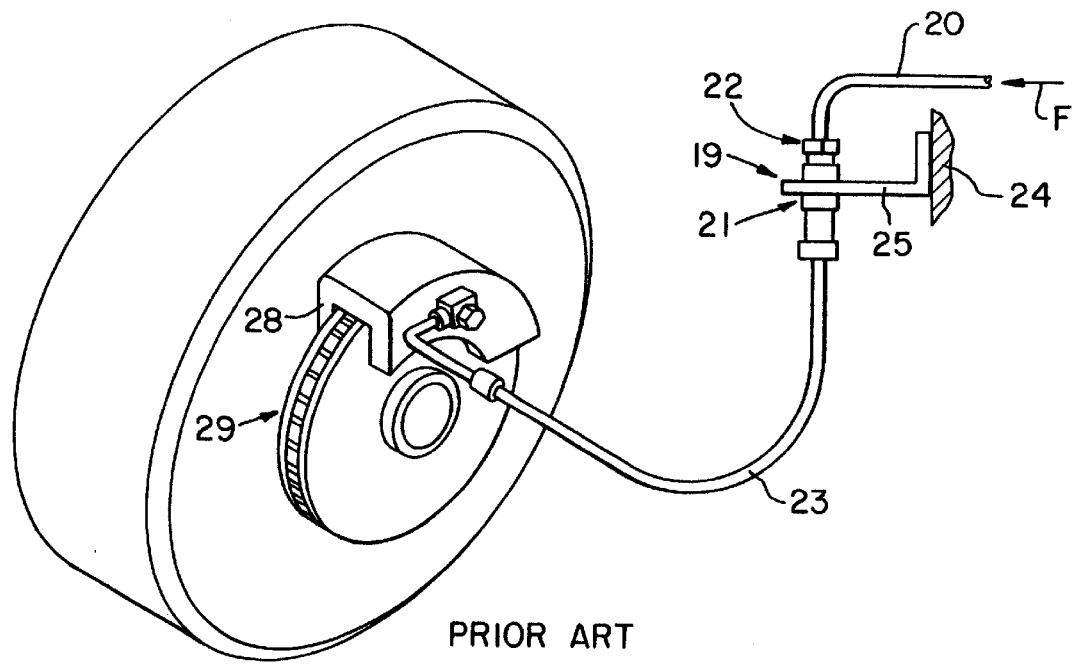
FIG. 1 is a perspective view of a prior art arrangement for joining a metal tube to a flexible hose.

Referring now to FIG. 1, there is shown a prior art coupling arrangements 19 for connecting relatively small diameter tubes 20 such as brake tubes to fittings 21 by threaded insert-type connections 22. The fittings 21 are crimped to a hose 23 which carries relatively high pressure hydraulic fluid. In FIG. 1, a part of a truck chassis or frame 24 retains the coupling 19 thereon with a bracket 25 to hold the coupling rigid with respect to the frame. The hose 23 is relatively flexible and may be retained to other portions of the chassis by clamps while the tubes 20 may also be retained to the chassis 24 by clamps 25. One of the tubes 20 is attached to a hydraulically driven device such as a brake caliper 28 in a disk brake 29. The present invention replaces the couplings 19 with a more reliable and more economical coupling arrangements. While a disk brake 29 is shown in FIG. 1, the invention has other uses for other types of hydraulic connections such as connections for clutches, and any other arrangement in which a flexible hose is connected to a rigid tube.

Figure 2:
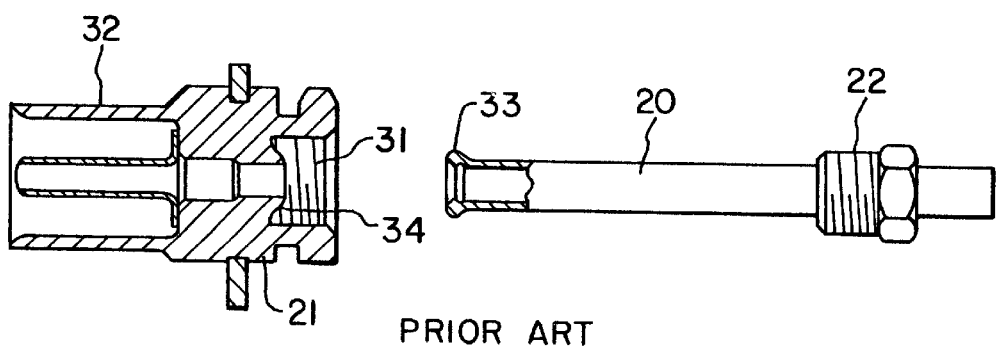
FIG. 2 is a side view, mostly in elevation, showing a first embodiment of a prior art threaded coupling used to join a tube to a hose.
Figure 3:
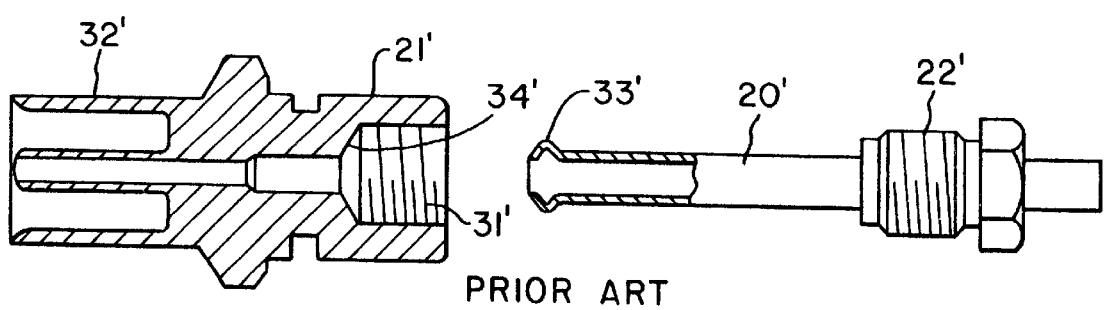
FIG. 3 is a side view, mostly in elevation, showing a second embodiment of a prior art threaded coupling used to join a metal tube to a hose.

Referring now to FIGS. 2 and 3 which show in more detail the prior art coupling 19 of FIG. 1, it is seen that the threaded nut 22 is received in a threaded recess 31 of the fitting 21 while the hose 23 is crimped to the fitting via a crimping collar 32. In the arrangement of FIG. 2, the tube 20 has a flared end 33 and the fitting 21 has an inverted or convex seat 34. In the embodiment of FIG. 3, the fitting 21' has a concave seat 34' which receives a bubble end 33' of the tube 20'. The externally threaded nut 22' then threads into the threaded bore 31 ' in the same way that the threaded nut 22 threads into the threaded bore 31 of FIG. 2. In practice, the arrangements of FIGS. 2 and 3 tend to have multiple components.

Figure 4:
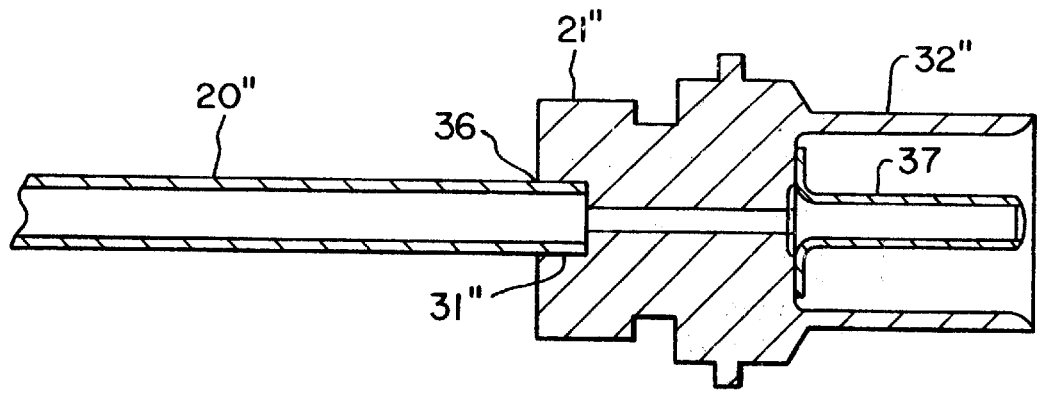
FIG. 4 is a side elevation of a prior art brazed joint used to couple a metal tube to a flexible hose.

Referring now to FIG. 4, in an attempt to avoid the expense and minimize the difficulties of a coupling 19, such as the coupling of FIGS. 2 and 3, wherein an externally threaded nut 22, 22' must be threaded into a threaded bore 31, 31', the tube 20" of FIG. 4 is press-fitted into a smooth recess 31" of a fitting 21" and copper brazed at juncture 36. The fitting 21" is then plated, which requires plating of an assembly that has the relatively long portion of the tube 20" attached to the fitting 21". In practice, the arrangement of FIG. 4 also tends to use an insertion tube 37, which results in more part-to-part junctures that increase the number of potential leak paths.

Embodiments of the Invention: FIGS. 5–12

In order to improve upon the couplings illustrated in FIGS. 1–4 as well as other couplings, the present invention eliminates a need to physically join the components of the tube-to-hose couplings by hand at assembly plants, as well as reducing leak paths, component costs and part number counts. Moreover, as opposed to brazed tube designs, such as that of FIG. 4, tolerance control is increased, as is routing control.

Figure 5:
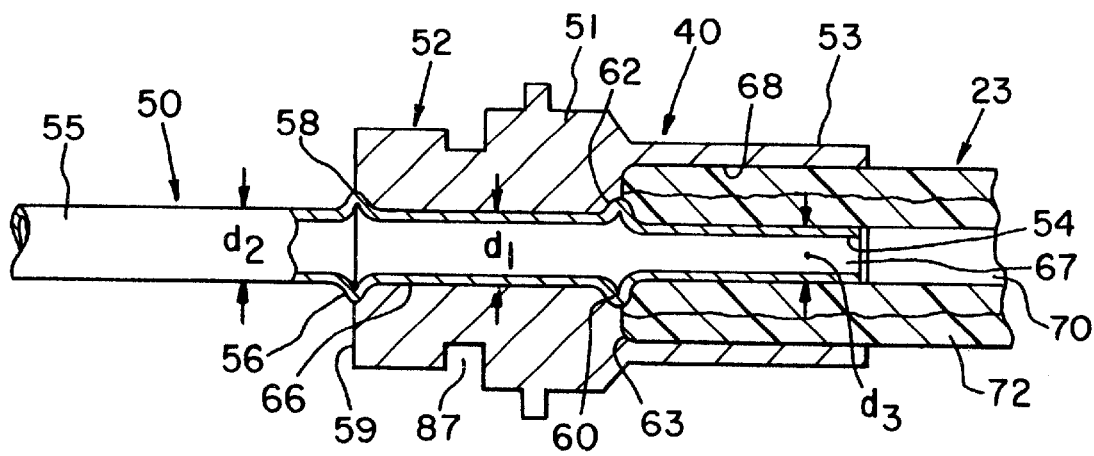
FIG. 5 is a side view, mostly in elevation, showing a first embodiment of a coupling in accordance with the present invention utilized to couple metal tube to a flexible hose.

Referring now to the first embodiment of the present invention illustrated in FIGS. 5–9, a high pressure integral tube coupling 40 enables a direct connection between a metal tube 50 and a flexible hose 23 (see FIG. 1), such as a high pressure resistant rubber hose, without a need for rotating threaded coupling components or brazing, thus eliminating parts or steps while retaining their function. As is seen in FIG. 5, the metal tube 50 is positioned within a body portion 51 of a fitting 52 to which the hose 23 of FIG. 1 is subsequently coupled by deforming a crimping collar 53 therearound so that the hose is axially retained within the fitting 52 and is radially sealed against an end portion 54 of the tube. The tube 50 corresponds to the tubes 20 shown in the prior art arrangements of FIGS. 1–4 and has an internal diameter of about 0.1250 inch, which internal diameter could range from about 0.125 to about 0.145 inch.

In order to retain the tube 50 in the fitting 52, a back bead 56 is preferably seated within an annular bead pocket 58 formed in a back end 59 of the fitting 52 while a front bead 60 is preferably seated in a pocket 62 formed in front end 63 of the fitting located just before the crimping collar 53. A smooth bore 66 extends completely through the fitting 52 into a cylindrical space 68 defined by the crimping collar 53. While the pockets 58 and 62 are preferable, it is within the scope of this disclosure to form the coupling without the pockets by crimping the tube 50 directly against the radial end surfaces of the fitting (See FIG. 9).

The diameter $d_1$, of the smooth bore 66 is slightly greater than the diameter $d_2$ of the tube 50 so that the tube slides through the smooth bore. While the diameter $d_1$ is slightly larger than the diameter of $d_2$, it need only be large enough so that the $d_2$ will slide readily therethrough. There could, however, be a slight press fit of the tube 50 within the bore 66.

The end 54 of the tube 50 has a reduced diameter portion 67 of a diameter $d_3$ which is slidably receivable within the bore 70 of the hose 23 and is of a length substantially equal to that of the crimping collar 53. Consequently, the bore 70 of the hose 23 is supported during the crimping step which deforms the material 72 of the hose.

Figure 6A:
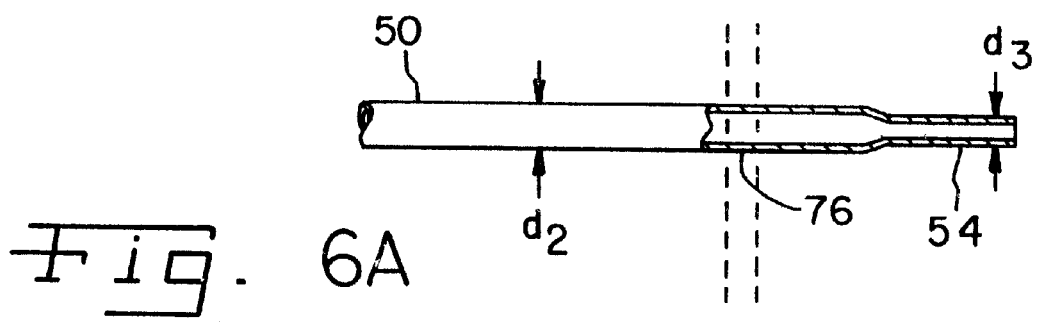
FIGS. 6A–6D are side views, mostly in elevation, illustrating the fabrication and assembly of the coupling of FIG. 5.
Figure 6B:
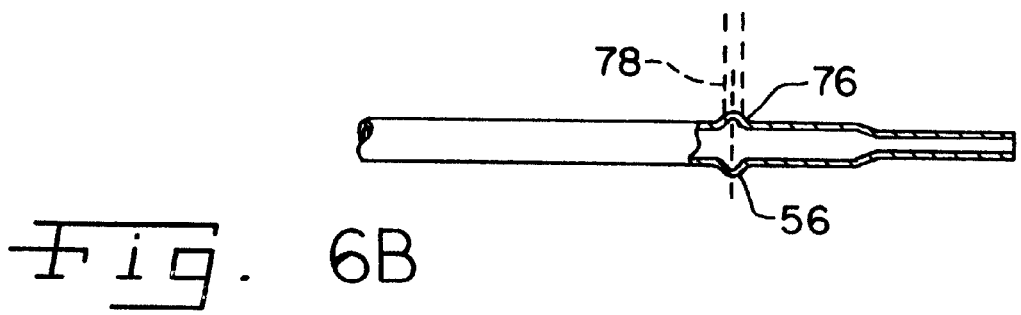

Referring now to FIGS. 6A–6D which illustrate the method fabricating and assembling the coupling 40, it is seen that the metal tube 50 has its end portion 54 drawn to have the reduced diameter $d_3$ which is less than the diameter $d_2$ of the tube 50. As is seen in FIG. 6B, the back bead 56 is formed by an applied force which pushes a portion 76 of the tube 50 back, thus forming a beaded area in proximity with line 78.

Figure 7:
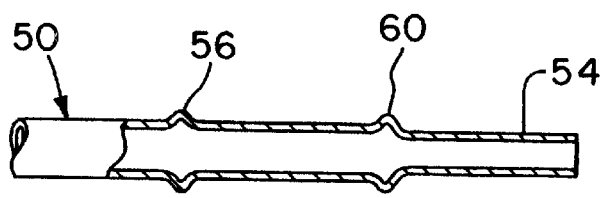
FIG. 7 is a side elevation showing the tube of the present invention, but for clarity illustrated without the fitting.
Figure 6C:
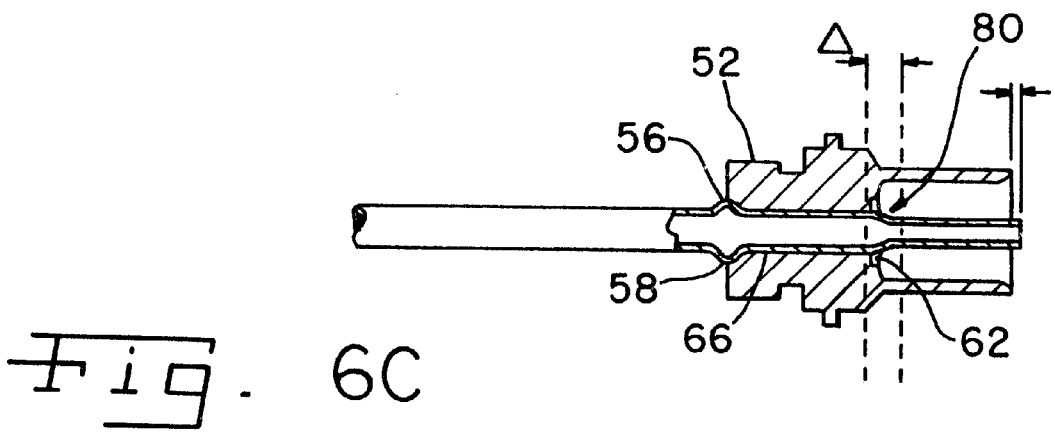
Figure 6D:
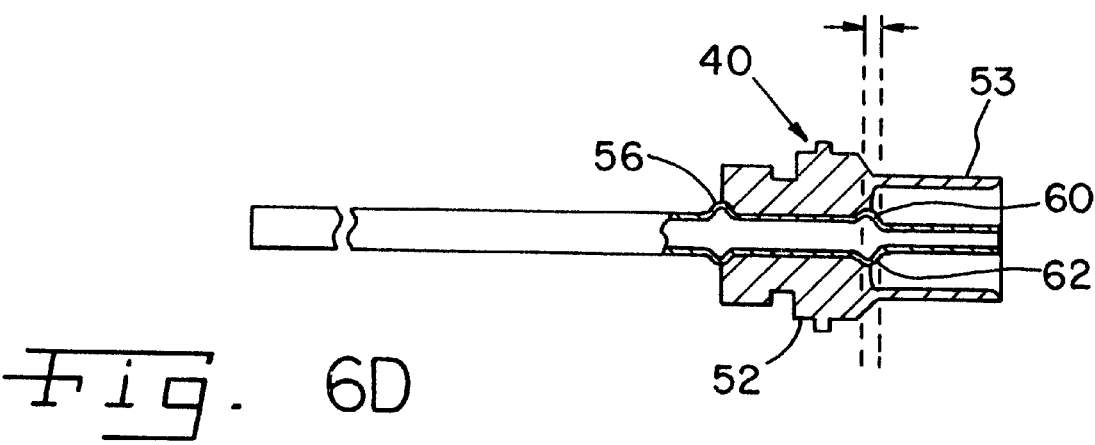
Figure 8:
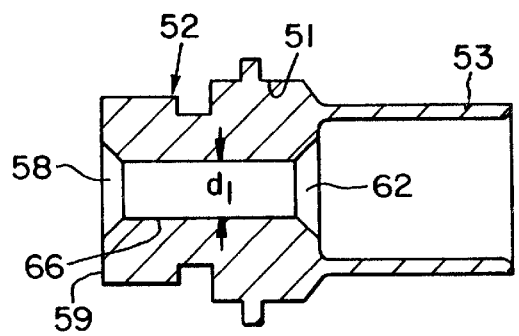
FIG. 8 is a side elevation of a fitting shown in FIGS. 5, 6B and 6D showing an embodiment of the fitting with pockets for receiving beads formed on the tube.

As is seen in FIG. 6C, the thus deformed tube 50 is inserted through the smooth bore 66 of the fitting 52 so that the back bead 56 fits into the annular bead pocket 58 at the back end 59 of the body 51 of the fitting. The annular bead pocket 58 is formed in or machined in the back end 59 of the fitting and has a diameter substantially greater than the diameter $d_2$ of the smooth bore 66. It is to be kept in mind that the bead pocket 58 is a desirable but optional feature. Referring now to FIG. 6D in combination with FIG. 6C, the front bead 60 is then formed by using an applied force to the tube 50 rearwardly so that a portion 80 of the tube 50 deforms into the front bead 60 which seats within the annular front bead pocket 62 at the front end 64 of the body 51 of fitting 52. The structure of the tube 50 in the absence of the fitting 52 is shown in FIG. 7, while the structure of the fitting absent the tube is shown in FIG. 8.

In the first embodiment of the invention, it is seen that the coupling 40 is accomplished by two axial deformations of the tube 50, one prior to inserting the tube 50 into the fitting 52 and the other subsequent to the insertion. The final step is to radially crimp the crimping collar 53 which is a conventional one-step procedure. If the arrangement is to be used with the brake line of FIG. 1, the fitting 52 with the tube 50 connected thereto may be first inserted into an opening in the bracket 25 and a sliding clip slid into the annular groove 87 in the fitting 52. The hose 23 is then inserted in the space 68 in the crimping collar 53 and the crimping collar crimped about the hose. By having a press fitting between the tube 50 and the fitting 52, rotation of the fitting relative to the tube is eliminated while maintaining a fluid tight seal.

Preferably, the metal tube 50 is made of steel and is pre-coated by SAE-J527 Standards, sliding fit. Other materials which may be used are copper, nickel, NYLON® (polyamide) or polyvinyl fluoride. If relatively thick plastic coatings such as NYLON® are used, the coating preferably terminates before the first bead 56; however, as is seen in the third embodiment of FIGS. 10 and 11, can continue to bead 60. The barbed or stem structure beyond the beads 56 and 60 has a controlled inside diameter as well as a controlled outside diameter which permits the assembly to pass the Federal Motor Vehicle Safety Standards for minimum fluid passage diameter. Moreover, the barb or stem structure can be produced either with or without annular grooves to increase tensile integrity of the coupling. Since the end 54 of the tube is received directly within the bore 70 of the hose 23, potential leak paths which occur with additional elements, such as those in prior art threaded connections and brazed tubular supports, are eliminated.

Figure 9:
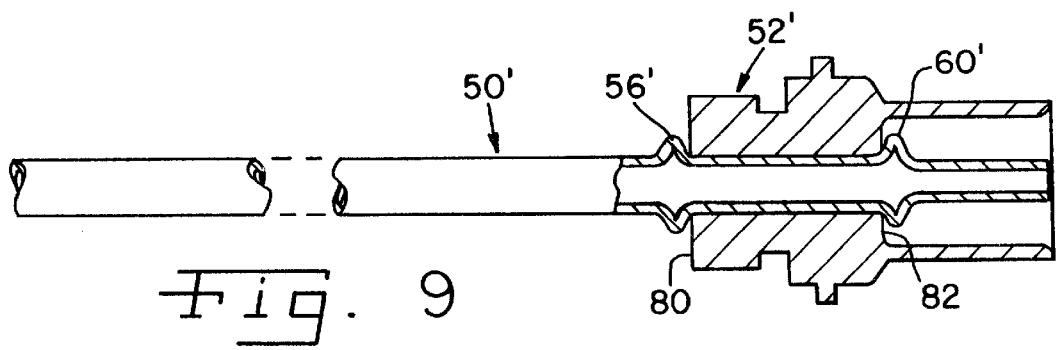
FIG. 9 is a side elevation of a second embodiment of the fitting of FIGS. 5, 6B and 6D having no pockets for receiving beads on the tube.

Referring now to FIG. 9, there is shown a second embodiment of the invention, wherein the bead pockets 58 and 62 are deleted from the fitting 52' so that beads 56' and 60' press directly against the radially extending back and front end surfaces 80 and 82, respectively of the fitting 52'. Friction between the end surface 80 and back bead 56 and between the front end surface 82 and the front bead 60 prevents rotation of the tube 50 within the fitting. In addition, there is a slight friction fit between the tube 50 and the bore 66' which provides a fluid seal.

Figure 10:
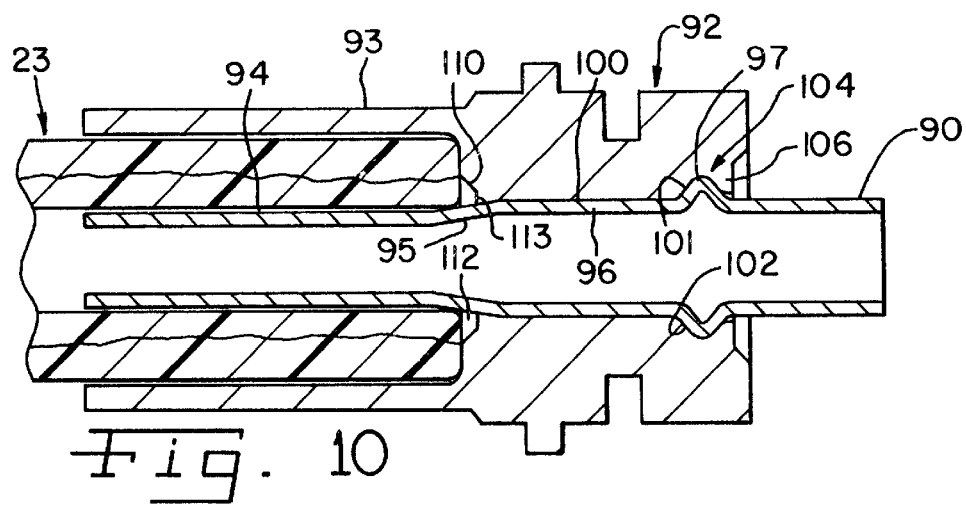
FIG. 10 is a side elevation showing a third embodiment of the invention.
Figure 11:
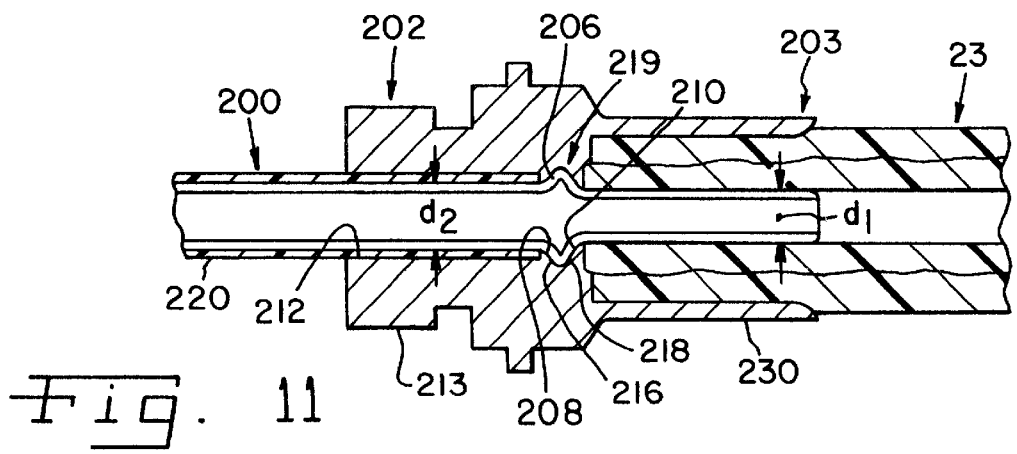
FIG. 11 is a side elevation of a fourth embodiment of the invention.

Referring now to FIG. 10, there is shown a third embodiment of the invention wherein a tube 90 is inserted into a fitting 92 having a crimping collar 93. The tube 90 has a necked down portion 94 joined thereto by a frusto-conical section or tapered 95. The frusto-conical section 95 joins an intermediate section 96 just in front of a bead 97. The fitting 92 has a smooth bore 100 that has an abutment surface 101 defined by an annular shoulder 102 therein that is disposed within in an annular recess 104. As with the embodiment of FIGS. 5–9, the tube 90 is shoved into the fitting 92 (as shown in FIG. 6C) until the bead 97 abuts the shoulder 102 of the abutment surface 101. An annular portion 106 of the wall of the recess 104 is then deformed by staking the portion 106 against the bead 97 to retain the tube 90 within the bore 100 of the fitting 92. Thereafter, a portion 110 of a second annular recess 112 within the fitting proximate the crimping collar 93 is deformed against the tapered section 95 of the tube 90 to provide a tapered portion 113 of the bore 100 against which the tapered portion of the tube seats. This seals the tube 90 within the fitting 92 at substantially three locations, whereafter the hose 23 is secured within the fitting 92 by deforming the crimping collar 93. The arrangement of the second embodiment of the invention shown in FIG. 10 is used substantially as the arrangement of the first embodiment shown in FIGS. 5–9. As with the embodiments of FIGS. 5–8 and 9, the embodiment of FIG. 10 is used in situations such as that of FIG. 1 where a flexible hose 23 connects a source of hydraulic fluid to a tube 20, which tube retains fluid which operates a hydraulic device, such as the calipers of a brake, or a clutch, or any other device requiring high pressure hydraulic fluid delivered via a flexible hose.

Referring now to FIGS. 11 and 12A–D, there is shown a fourth embodiment of the invention wherein a metal tube 200 is coupled to the hose 23 by a fitting 202 to form a coupling 203. The metal tube 200 has a drawn down portion 204 which has a relatively small outside diameter $d_1$ which is less than the outside diameter $d_2$ of a main portion 205 of the tube. In addition, the tube 200 has an annular bead 206 having a first axially facing surface 208 and a second axially facing surface 210. Tube 200 is received through a smooth bore 212 in a body portion 213 of the fitting 202 and, if the metal tube does not have a plastic coating, may have an interference fit. Tube 200 is retained within the fitting 202 by abutment between the first surface 208 of the bead 206 with a shoulder 216 adjacent the bore 212 and by a swagged, staked or otherwise deformed annular portion 218 of the fitting 202 that forms a second abutment which engages the surface 210 of the bead. A surface of the second abutment faces away from hollow portion 230. The fitting 202 and tube 200 are therefore prevented from any axial or rotational movement, one with respect to the other while also being provided with metal-to-metal fluid seals 219 and 216 which prevent entry of moisture and corrosive agents that might degrade the interior of the coupling.

Preferably, the main portion 205 of the metal tube 200 is coated or covered with a layer 220 of a plastic material such as, for example, a polyamide, i.e., NYLON®, which layer of plastic material terminates before or at the bead 206 leaving the bead uncoated for the metal-to-metal seal 219 with the fitting as well as leaving the small diameter portion 204 uncoated for ready receipt in the bore of the hose 23. Examples of other plastic materials which may be used are polyvinylfluoride or polypropylene.

A preferred example of a tube configuration for the tube 200 comprises a base tube of SAE 1008/1010 mild steel with a layer of copper plating over which is a 10–15 $\mu$m 95% zinc/5% aluminum hot dip coating. The layer of plastic material 220 is preferably a layer of polyamide over a binder layer which is on average about 3.5 $\mu$m thick.

Figure 12A:
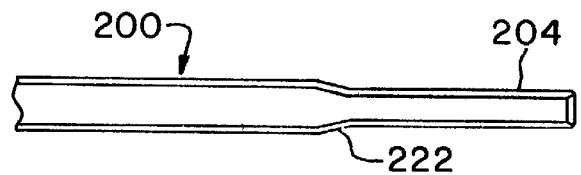
FIGS. 12A–D are side elevation views showing a preferred assembly technique for embodiment of the invention illustrated in FIG. 11.
Figure 12B:
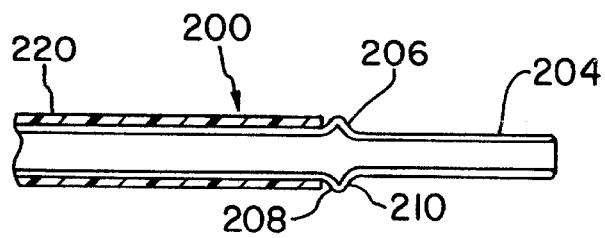

Referring now to FIGS. 12A–12D, preferred steps in assembling the coupling 203 are shown in sequence. As is seen in FIG. 12A, tube 200 is provided. Tube 200 is drawn to provide the small diameter portion 204 and to form frusto-conical portion 222 which joins the small diameter portion 201 to the remainder of the tube 200. As is seen in FIG. 12B, the tube is deformed by pressing axially against the tube so that it bulges outwardly to form the bubble 206 generally in the location of the fiusto-conical portion 222. If the entire tube 200 has previously been coated with a plastic layer 220, the plastic layer is stripped from the insertion portion 204 and the bead 206 prior to drawing.

There are a number of methods to remove a portion of the plastic layer 220 from a portion of the tube 200. These methods include applying mechanical cutting tools, abrasive wheels or brushes or using laser ablation, chemical solvents or water jet ablation. The tube 200 may be axially moved and rotated as the plastic and other non-metallic materials are stripped therefrom preferably prior to drawing or otherwise deforming the tube 200.

Figure 12C:
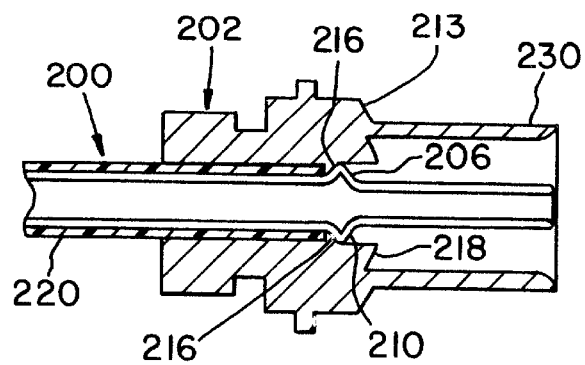
Figure 12D:
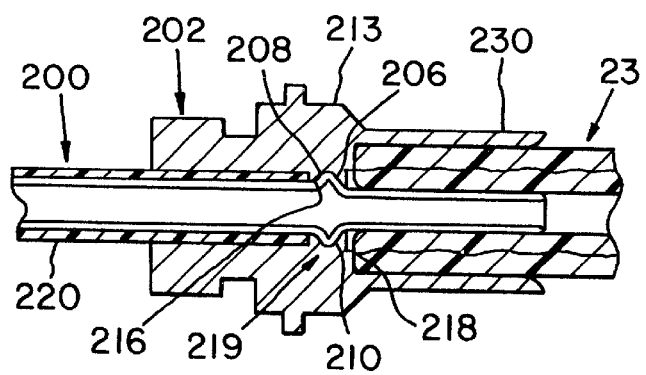

Referring now to FIG. 12C, the fitting 202 is slid along the length of the tube 200 from its opposite end or, in the alternative, the tube is simply inserted into the bore 212 until the surface 208 on the bead 206 is abutted by the shoulder 216 that is adjacent the end of the bore. Preferably, the fit between the tube 200 and the bore 212 is a sliding fit with the plastic layer 220 sliding within the bore. The fit between the tube 200 and bore may be sufficiently tight to form a fluid tight seal. As is seen in FIG. 12D, the annular portion 218 of the wide portion of the bore 212 is then swaged, staked or otherwise deformed against the second face 210 of the bead 206 in order to form the coupling 203 which firmly retains the tube 200 within the fitting 202 and forms the metal-to-metal, fluid tight seal 219 therewith.

After the coupling 203 is formed, the hose 23 (FIG. 11) is inserted into a hollow portion 230 of the fitting 202 which forms a crimping collar that is unitary with the body portion 213 of the fitting. The crimping collar 230 is then deformed radially inwardly to retain the hose 23 permanently and non-rotatably in communication with the tube 200.

By utilizing the arrangement of the present invention, tubes are retained within fittings, such as fittings for joining the tubes to hoses, utilizing mechanical steps which involve neither rotating the tube with respect to the fitting, brazing the tube to the fitting or using a retaining unit.

From the foregoing description, one skilled in the art can easily ascertain the essential characteristics of this invention, and without departing from the spirit and scope thereof, can make various changes and modification of the invention to adapt it to various usages and conditions.

What is claimed is:

1. A coupling for connecting a tube to a hose comprising:
   a metal tube having a main portion and an insertion portion, the insertion portion having an outer diameter corresponding to the inner diameter of the hose for insertion therein and a controlled inner diameter;
   a radial projection on the metal tube adjacent the insertion portion;
   a layer of plastic material covering the main portion of the tube and terminating at the radial projection, the radial projection being free of plastic material;
   a fitting having a bore therein slidably receiving the main portion of the metal tube, the fitting including an abutment surface extending radially of the bore and including an annular recess in which the radial projection on the tube seats; and
   an annular deformed portion adjacent the annular recess, which annular deformed portion is deformed into abutment with the radial projection to form a metal-to-metal fluid tight seal which also fixes the metal tube to the fitting.

2. The coupling of claim 1, wherein the metal tube has an outer diameter which is larger than the outer diameter of the insertion portion.

3. The coupling of claim 2, wherein the fitting has a unitary hollow portion which extends beyond the abutment surface and surrounds the insertion portion of the metal tube wherein the hollow portion receives the hose.

4. The coupling of claim 2, wherein the unitary hollow portion receives the hose therein and wherein the hollow portion is crimped against the hose with the insertion portion of the tube received within the hose.

5. The coupling arrangement of claim 4, wherein the hollow portion is coaxial with both the main portion and insertion portion of the metal tube.

6. The coupling of claim 4, wherein the tube, hose and fitting are components of a hydraulic or other automotive fluids as required and are adapted to be filled with hydraulic fluid.

7. The coupling of claim 1, wherein the layer of plastic material is in a sealing relationship with the bore of the fitting.

8. The coupling arrangement of claim 7, wherein the layer of plastic material is selected from the group consisting of polyamide, polyvinylfluoride and polypropylene.

9. The coupling arrangement of claim 3, wherein the metal tube has a tapered section joining the insertion portion to the main portion and wherein the bore has a corresponding tapered portion against which the tapered portion of the metal tube seats.

10. The coupling arrangement of claim 9, wherein the abutment surface of the fitting is disposed adjacent the metal tube within the fitting when the annular deformed portion is deformed against the radial projection and the main portion of the tube extends away from the fitting and wherein the tapered portion of the fitting is positioned adjacent a crimping collar that is unitary with the fitting so that the insertion portion of the metal tube extends within the crimping collar for receiving and clamping the hose therein with the insertion portion in the hose.

* * * * *